2,898,307

A METHOD FOR PREPARING ALUMINUM HYDRATE COMPOSITIONS

Carl D. Keith, Munster, Ind., assignor to Sinclair Refining Company, New York, N.Y., a corporation of Maine No Drawing. Application September 10, 1956
Serial No. 608,686

9 Claims. (Cl. 252—463)

This invention relates to the preparation of alumina hydrate compositions. More specifically, the invention is concerned with the preparation of alumina hydrates composed in part of alumina trihydrate.

Alumina hydrates are particularly useful as catalyst base precursors. In one process for manufacturing the catalyst the hydrate can be purified, dried, impregnated with a catalytically-active metal component and then processed to the final catalyst by drying and by activation or calcination at high temperatures, e.g. about 400 to 700° C. The alumina hydrate might be composed of monohydrate, amorphous hydrous alumina or trihydrate. However, particularly advantageous catalyst base precursors are provided when the alumina hydrate is a mixture of one or more of the trihydrates, gibbsite, bayerite and randomite (bayerite-II), with one or both of the amorphous and monohydrate forms. Such mixtures could be provided by obtaining the separate hydrate phases and then combining them in the desired ratio. This represents a cumbersome and relatively expensive process since two reaction systems might be necessary with subsequent blending of the separate products. If a single system be employed, facilities must be available for storage of one component while another is being made, and blending is still necessary. Also the use of a single reaction system could, without careful and tedious control, give rise to seeding problems, i.e. crystals from one reaction might undesirably seed the other system. If the mixed phase product be obtained by blending, the system may not be homogeneous.

A mixed trihydrate-monohydrate and/or amorphous catalyst base precursor has been obtained by precipitating a hydrous alumina phase through reaction of aluminum chloride and ammonium hydroxide and then allowing the hydrate to age to obtain the desired trihydrate content. This manner of operation is also disadvantageous since when producing large amounts of catalyst base precursor material costs are increased materially as a building containing tankage is usually necessary to provide the proper aging environment. This cost is particularly burdensome since the hydrate may be aged for a period of days as an isolated batch which necessitates a large amount of tankage to provide sufficient hold-up capacity to enable the other operations of the overall catalyst manufacturing process to be conducted continuously or semi-continuously. Also frequent sampling and analysis may be required to follow the aging pattern.

I have now developed a method for producing alumina hydrate containing trihydrate and the amorphous or monohydrate (boehmite) forms which is highly advantageous in that the separate hydrous phases are easily obtained. Yet this composition is provided without observing a prolonged aging period and my method need not contain more than a single reaction system. In the method, the separate hydrous phases are made from sodium aluminate to provide a relatively homogeneous mixture of the phases.

In preparing the mixed phases of alumina hydrate, sodium aluminate, usually containing not more than about a 5:1 molar ratio of sodium oxide to alumina, is combined in an essentially aqueous medium with a material which is acid-acting toward the aluminate. The pH of the initial aqueous aluminate solution is usually at least about 11.8 and frequently approximately 12. The purpose of adding the more acidic material is to provide for precipitation of alumina trihydrate. I wish that only a portion (for instance about 10 to 90 weight percent) of the final alumina hydrate be composed of trihydrate and to obtain this result I have found that the more acidic material cannot be indiscriminately added to the alumina solution. Thus this material must not be incorporated so fast that the pH of the aqueous mixture goes below about 10.5 during the precipitation of the trihydrate. Usually at least enough of the more acidic material is added to bring the pH down to about 11.7, and preferably the lowest pH obtained during the addition is about 11.3. In a system found particularly advantageous I add enough of the more acidic material to lower the pH of the aqueous solution to about 11 to 11.5, or preferably about 11.3 to 11.5, and then discontinue the addition to allow the pH to rise to at least about 11.6 while alumina trihydrate is formed. Generally, while the trihydrate is produced the pH will not rise above about 12.5.

There are several factors affecting the formation of the trihydrate by the addition of the more acidic material. Frequently, as the quantity of a given more acidic material added is increased, the greater will be the amount of trihydrate ultimately formed providing the pH is maintained above about 10.5. If a small amount of the more acidic material is added or if the addition be slow, the formation of trihydrate will also be relatively slow, that is it will take place over a period of at least several minutes even with intimate mixing. Thus there will be a good chance of stopping the formation at any desired trihydrate concentration within the maximum that could be formed as a consequence of the amount of more acidic material added. As the rate of addition and the amount of more acidic material added increase, the formation of trihydrate becomes faster even when the pH is above about 10.5 and there is a short time in which to control or substantially stop trihydrate formation. Should the more acidic material be added in excessive amounts and at a fast rate to carry the pH below about 10.5 before any substantial trihydrate is formed, then none will subsequently be obtained even upon mixing.

The point at which the operator will stop the trihydrate formation will depend upon the desired composition of the final alumina hydrate. If such a small amount of the acid-acting material is added that the amount of trihydrate formed within a feasible time would not be beyond that wanted in the final composition, then the operator need not take steps to stop the reaction. However, it may be more desirable to add greater quantities of the more acidic material to obtain a faster rate of trihydrate formation and then stop the reaction when the desired composition has been obtained. As the trihydrate is made in this system relatively fast, I prefer to add a rather small quantity of the more acidic material and then intimately mix the reactants to bring on trihydrate formation. Generally the mixing period after the addition of the more acidic material will be at least about 5 minutes, and there seems to be no particular advantage in mixing for more than about 1 hour. Mixing could be continued, however, as long as the operator wishes providing the trihydrate formation is not excessive. Instead of mixing, the operator may just let the reactants be quiescent for a waiting period, preferably from about 5 minutes to an hour, while trihydrate is formed. This waiting period could be extended as necessary to obtain the wanted amount of trihydrate, and mixing might be instigated periodically. If desired a seed of trihydrate can be added to the aqueous solution in which case the mixing or waiting periods might be avoided. Also the rate of trihydrate formation will depend to some degree upon the specific more acidic material added to the aluminate, the temperature of the mixed aqueous solution, the source of the aluminate, the sodium oxide to alumina ratio in the aluminate, and the type of equipment employed. Some commercially available sodium aluminates are stabilized by inclusion of a molar excess of sodium oxide or a gluconate, and when such aluminates are employed in my method the amount of more acidic material required for a given rate of trihydrate formation may be increased. My method can be conducted in a continuous or semi-continuous system, e.g. the sodium aluminate and more acidic material could be combined and mixed in a pipe as a flowing stream.

When forming the trihydrate the temperature of the aqueous mixture will generally not be greater than 100° C. as higher temperatures would require the use of super-atmospheric pressures to maintain the liquid phase. Temperatures from about 20 to 50° C. are preferred from an economic standpoint. There is no particular advantage associated with the use of less than ambient temperatures. Should it be desirable to control the distribution of the separate trihydrate phases this can be done to some extent. For instance, gibbsite is favored by employing aluminates having a molar ratio of sodium oxide to alumina greater than about 2:1, temperatures of about 60 to 100° C., high alumina concentrations greater than about 75 grams of alumina per liter, and slow addition of the more acidic material such as carbon dioxide when effecting trihydrate precipitation. Reaction conditions in the other direction, for instance sodium oxide to alumina molar ratios of less than about 2:1 and temperatures less than about 60° C., favor the formation of bayerite.

In providing the trihydrate the material added which is acid-acting toward the sodium aluminate can be selected from a rather large group. In general, the suitable materials are compounds which are water-soluble to a substantial extent in the aqueous aluminate solution and do not form insoluble precipitates with the aluminum in this medium. Of course, as the result of the addition of these materials alumina hydrate is precipitated. These materials can be organic or inorganic. Thus I can use the mineral acidic agents such as sulfuric acid, hydrochloric acid, nitric acid, carbon dioxide, sulfur trioxide and hydrogen chloride, and when gaseous, these agents can be mixed with inert materials, such as air, nitrogen, etc., to prevent excessive local precipitation. Various salts are useful and these include the aluminum salts, such as aluminum sulfate, aluminum chloride, aluminum nitrate; and acid salts, for instance ammonium bicarbonate, ammonium bisulfate and sodium bisulfate. The salts of amines and ammonia can be employed, such as ammonium acetate, ammonium carbonate and ammonium sulfate. Among the organic materials which can be incorporated in the aqueous aluminate solution to provide the trihydrate are the carboxylic acids, such as formic acid, acetic acid and mono- and dichloroacetic acids.

In order to provide a final catalyst base precursor having upon calcination a substantial amount of its pore volume in large pores greater than 100 Angstrom units radius, it is advantageous to form the trihydrate as small crystallites. In my present process small crystallites are provided when a relatively large quantity of the more acidic material is employed in precipitating the trihydrate. By so doing a large number of trihydrate nuclei are initially provided which afford a great many centers for growth in obtaining the wanted trihydrate content. On the other hand, should only a small amount of the more acidic material be used the lesser number of nuclei provided would get relatively large as the solution reached the desired trihydrate content.

After the trihydrate formation in the aqueous sodium aluminate solution is completed or when a desired amount of trihydrate has been produced, I provide the monohydrate and/or the amorphous hydrous alumina from the unreacted sodium aluminate in the solution by the addition of another quantity of a material which is acid-acting towards the aluminate. However, in this operation the amount of acid-acting material added is sufficient to take the pH of the system to less than about 10 and preferably about 7 or less. If the pH is reduced to about 7 or less, substantially all of the sodium aluminate is reacted and the sodium content of the resulting slurry can be substantially carried away by filtering off the liquid. This decreases the amount of water washing necessary to reduce the sodium content to a very low value which is frequently advantageous when the alumina hydrate will be employed as a catalyst base precursor. Should all of the sodium aluminate not be reacted, washing would be much more difficult and costly as sodium in the form of sodium aluminate is more difficult to wash away and useful starting reagent is diluted in the wash water. When using carbon dioxide in providing the trihydrate and another acid-acting material to provide the boehmite or amorphous phases, it is preferred to carry the pH low enough to release carbon dioxide from the aqueous solution, for instance this pH is preferably not more than about 5.5.

When controlling the amount of trihydrate within somewhat restricted limits it is desirable to add the more acidic material fast enough to prevent formation of appreciable quantities of trihydrate while providing the monohydrate or amorphous phases. The temperatures employed when obtaining these latter phases can be similar to those used when forming trihydrate with again about 20 to 50° C. being preferred. The acid-acting materials which are utilized in providing the monohydrate and amorphous phases are the same as those employed in providing the trihydrate. Also, different specific members of the group can be used in the separate alumina hydrate formation stages. For instance, sulfuric acid might be employed in precipitating trihydrate and aluminum sulfate used to provide the monohydrate or amorphous phases. Advantageously, the acid-acting materials utilized in forming the trihydrate and monohydrate or amorphous alumina are the mineral acids and the acidic aluminum salts. Although it has been indicated that in the first step of my process alumina trihydrate is provided and in the second step the monohydrate and amorphous phases are formed, there is an indication that amorphous material may also be obtained during the trihydrate formation stage.

The alumina hydrate prepared by my present method contains about 10 to 90 weight percent of trihydrate with substantially the remainder being monohydrate or amorphous hydrous alumina or mixtures of the latter two phases. Any one or more of the separate trihydrate forms can be present and the several hydrate phases are identified by X-ray diffraction techniques on samples dried at 110 to 120° C. The hydrate compositions are particularly useful as catalyst base precursors. When so employed they can be washed to remove substantial quantities of ions such as sodium and sulfate which frequently act as catalyst poisons. Washing of the hydrate can be conducted with or without previous drying of the hydrate. The washed hydrate can be dried to remove substantially the free water present usually at temperatures of about 110 to 250° C. The dried material can be calcined or activated at temperatures of about 400 to 700° C. or more. The calcination effects substantial removal of the water of crystallization from the hydrate. If desired the final catalyst can be in finely divided form for use in fluidized processing or in macrosize particles, for instance about $\frac{1}{16}$ to $\frac{1}{4}$ inch in diameter and about $\frac{1}{16}$ to 1 inch or more in length, for use in fixed or moving bed reactors. The larger particles can be formed by extrusion or tableting and these operations can be conducted either before or after drying or calcination.

In addition to the alumina base, the catalysts usually contain a minor amount of a catalytically-active component or promoter which contains one or more metallic elements. Among the frequently employed catalytically-active metals are those of groups V to VIII of the periodic table. The metals vanadium, molybdenum, tungsten, chromium, cobalt, nickel and platinum and mixtures of these metals are those most frequently employed particularly for the conversion of petroleum hydrocarbons. The metals or their compounds are deposited on or mixed with the catalyst base and the catalytically-active metal component usually comprises less than about 25 weight percent of the total composition. Most frequently, the metals are deposited on the supporting base in the oxide form or in a form which affords the oxide during calcination. The catalytically-active metal can be combined with the base component either before or after the alumina hydrate has been dried or calcined or before or after tableting or extrusion.

My alumina hydrate compositions are particularly useful as catalyst base precursors for supporting platinum and generally the platinum comprises about 0.1 to 1.5 weight percent of the final catalyst composition while the hydrate is predominantly trihydrate, preferably about 65 to 90 weight percent trihydrate. The small amount of platinum is usually present in such finely divided form that it is not detectable by X-ray diffraction techniques which means that if metallic crystals are present they are of size less than about 50 Angstrom units. Such catalysts are advantageously employed in reforming gasoline boiling range hydrocarbons to high octane components in the presence of free hydrogen. In general, the reforming catalysts are utilized at temperatures of about 800 to 1000° F., pressures of about 150 to 750 p.s.i., space velocities of about 1 to 20 weight of feed per weight of catalyst per hour (WHSV), and while supplying about 3 to 20 moles of hydrogen per mole of hydrocarbon feed. The catalysts can be reduced in hydrogen before being employed in the reforming process.

The alumina hydrate compositions of the present invention can also be used with particular advantage in supporting combinations of cobalt and molybdenum as the catalytically-active or promoting metal component. The resulting catalysts are useful for desulfurizing petroleum hydrocarbons and I prefer that when so employed the hydrate contain about 10 to 50 weight percent of trihydrate. These catalysts usually include at least about 1 percent of each of cobalt and molybdenum. In general, the hydrodesulfurization operation is conducted at about 500 to 1000° F., 100 to 2000 p.s.i., about 1 to 10 WHSV, and with about 500 to 5000 cubic feet of hydrogen being consumed for each barrel of hydrocarbon processed.

The following specific examples will serve to illustrate the method of the present invention but they are not to be considered limiting.

EXAMPLE I (786–51)

198 grams of aqueous sodium aluminate solution containing 44.7 grams of $Al_2O_3$ and 38.4 grams of $Na_2O$ ($Na_2O$ to $Al_2O_3$ ratio was about 1.41 to 1) were diluted with 1300 mls. of deionized water in a 4-liter beaker and a clear solution was obtained by filtration. Sulfuric acid solution No. 1 was prepared by pouring 17.47 grams of Du Pont C. P. reagent $H_2SO_4$ (95–98% $H_2SO_4$) into 150 mls. of deionized water. This solution was then diluted to 200 mls. by further addition of deionized water. Sulfuric acid solution No. 2 was prepared by pouring 91.3 grams of Du Pont C.P. reagent $H_2SO_4$ (95–98% $H_2SO_4$) into 750 mls. of deionized water. This solution was then diluted to 1000 mls. by further addition of deionized water. The sodium aluminate solution was heated to 40° C. on a hot plate. The beaker was fitted with an air driven stirrer and the contents of the beaker were stirred during the complete precipitation procedure. 200 mls. of sulfuric acid solution No. 1 were added to the beaker at the rate of 8 mls. a minute and the temperature was maintained during this addition at about 40° C. by heating the outside surface of the beaker with infra-red light. The following is a portion of the log maintained during the 25-minute period in which sulfuric acid solution No. 1 was added.

Log

| Time (Min.) | Total mls. $H_2SO_4$ Solution No. 1 Added | pH | Remarks |
| --- | --- | --- | --- |
| 0 | 0 | 12.1 | Addition started. |
| 4 | 32 | 12.1 | Small flocks of precipitate formed and redissolved. |
| 21 | 168 |  | Permanent precipitate forming. |
| 25 | 200 | 11.4 | Completed addition. |

After sulfuric acid solution No. 1 was added stirring was continued for 20 minutes while the temperature cooled to about 36° C. and the pH rose to about 12.1. In the initial portion of this stirring period precipitation was increasing and after about 10 minutes it suddenly became heavier. 600 mls. of sulfuric acid solution No. 2 were then added at the rate of 50 mls. per minute. After 10 minutes of this addition the pH of the mixture was 9.7 and at the end of the 12-minute addition period the pH was 5.3. The hydrate was immediately filtered from the mother liquor over a period of about ½ hour and the filter cake was dried in an Aminco forced air oven at 120° C. The dried filter cake analyzed 26 percent trihydrate with substantially the remainder being boehmite and amorphous alumina. The dried cake was washed six times at 66° C. with 2-liter portions of deionized water by the slurry-filter procedure. Before each filtration the previous filter cake was slurried 5 to 10 minutes and for the first wash the pH was adjusted to 9.5 by adding 63 mls. of ammonium hydroxide solution containing 1 part $NH_4OH$ to 1 part water. For the fourth wash the pH was adjusted to 9.1 by adding 4 mls. of the ammonium hydroxide solution. At the end of the washing period the final wash water gave an essentially negative sulfate test and the filter cake, upon drying at 120° C. in an Aminco forced air oven analyzed 30 percent trihydrate with the remainder being substantially monohydrate or amorphous alumina hydrate.

EXAMPLE II (786–18)

198 grams of aqueous sodium aluminate solution containing 44.7 grams of $Al_2O_3$ and 38.4 grams of $Na_2O$ ($Na_2O$ to $Al_2O_3$ ratio was about 1.41 to 1) were diluted with 1300 mls. of deionized water in a 4-liter beaker and a clear solution was obtained by filtration. An aluminum sulfate solution was prepared by dissolving 200 gms. of $Al_2(SO_4)_3 \cdot 18H_2O$ (Baker's C.P.) in sufficient deionized water to give 1000 mls. of solution. The sodium aluminate solution was heated to 40° C. on a hot plate. The beaker was fitted with an air driven stirrer and the contents of the beaker were stirred during the complete precipitation procedure. Approximately 9.1 gms. of $CO_2$ were added to the beaker at the rate of 10 liters per hour (STP) over a 28-minute period, and the temperature was maintained during this addition at about 40° C. by heating the outside surface of the beaker with infra-red light. The following is a portion of the log maintained during the 28-minute period during which $CO_2$ was added.

Log

| Time (Min.) | pH | Remarks |
|---|---|---|
| 0 | 12.1 | Addition started. |
| 17 | 11.7 | Trace of precipitate. |
| 20 | | Heavier precipitation. |
| 23 | 11.45 | |
| 28 | 11.4 | Completed addition. |

After the $CO_2$ was added stirring was continued for 10 minutes while the pH rose to about 11.9. 650 mls. of the aluminum sulfate solution were then added at the rate of 50 mls. per minute. After 8 minutes of this addition the pH of the mixture was 10.2 and at the end of the 14-minute addition period the pH was 5.1. The hydrate was then filtered from the mother liquor over a period of about 26 minutes and the filter cake was dried in an Aminco forced air oven at 120° C. The dried filter cake analyzed 66 percent trihydrate with substantially the remainder being boehmite and amorphous alumina hydrate. The dried cake was washed seven times at 66° C. with 2-liter portions of deionized water by the slurry-filter procedure. Before each filtration the previous filter cake was slurried 5 to 10 minutes and for the first wash the pH was adjusted to 9.5 by adding 25 mls. of ammonium hydroxide solution containing 1 part $NH_4OH$ to 1 part water. For the third and fifth washes the pH was adjusted to 9.1 and 9.2, respectively, by adding 4 mls. of the ammonium hydroxide solution. At the end of the washing period the final wash water gave an essentially negative sulfate test and the filter cake, upon drying at 120° C. in an Aminco forced air oven, analyzed 77 percent trihydrate with the remainder being substantially monohydrate or amorphous alumina hydrate.

EXAMPLE III (730–82)

An ammonium carbonate solution was prepared by diluting with deionized water 234 mls. of aqueous $(NH_4)_2CO_3$ solution (24.5 grams $CO_2$) to 450 mls. 90.1 grams of sodium aluminate (equivalent to about 50 grams of $Al_2O_3$) were dissolved in 1500 mls. of deionized water and filtered to provide a clear solution. The filtered solution was heated to 40° C. on a hot plate. To the heated solution in a 4-liter beaker fitted with an infra-red lamp and an air driven stirrer were added a slurry of 0.77 gram of bayerite (dried at 120° C. and ground to pass 300 mesh) in 50 mls. of deionized water. While stirring the mixture the prepared ammonium carbonate solution was added at the rate of approximately 15 mls. per minute with the infra-red lamp being employed to maintain a temperature of about 40° C. The ammonium carbonate solution was added over a period of about 30 minutes during which time ammonia was evolved as the alumina hydrate was precipitated. The precipitate was immediately filtered from the mother liquor and the filter cake was dried in an Aminco forced air oven at 120° C. The dried cake was washed twelve times with 1-liter portions of deionized water by the slurry-filter procedure. Before each filtration the previous filter cake was slurried 5 minutes and after the fifth wash the hydrate was allowed to stand overnight in 1 liter of deionized water. At the end of the washing period the wash water had a pH of 7.5. The washed hydrate was dried at 120° C. in an Aminco forced air oven and contained about 10 percent trihydrate with the remainder being substantially monohydrate or amorphous alumina hydrate.

EXAMPLES IV–IX

The following table includes data pertinent to several additional preparations made by the method of my present invention. The procedure of Example I was essentially followed in Examples IV–IX. In analyzing the hydrates only the trihydrate is reported with substantially the remainder being monohydrate or amorphous alumina hydrate.

EXAMPLE X

A desulfurization catalyst containing cobalt and molybdenum is made from my hydrate composition by first fitting a three-necked round bottomed flask with a heating

TABLE

| Example No. | Sodium Aluminate Solution Contained— | | Acid-Acting Material Addition | | | | | | | | | Analysis, Percent Trihydrate | |
|---|---|---|---|---|---|---|---|---|---|---|---|---|---|
| | | | First Addition Period | | | | Slurry Period Between Additions | | Second Addition Period | | | | |
| | Gms. $Al_2O_3$ | Gms. $Na_2O$ | Mat'l Added | Rate | Amount | Final pH | Time, Min. | Final pH | Mat'l Added | Rate | Mls. | Final pH | Hydrate Unwashed and Dried | Washed and Dried |
| IV (786-8) | 50 | 37.2 | $CO_2$ | 15 liters per hour (STP). | 13.2 gms. | 11.5 | 10 | 11.65 | $Al_2(SO_4)_3$ solution (20 gms. $Al_2(SO_4)_3$ .18$H_2O$/ 100 ml. solution). | 25 ml./ minute. | 625 | 5.2 | 53 | 64 |
| V (786-20) | 44.7 | 38.4 | $CO_2$ | 10 liters per hour (STP). | 9.0 gms. | 11.4 | 5 | 11.8 | do | 50 | 650 | 5.4 | 64 | |
| VI (786-29) | 44.7 | 38.4 | $CO_2$ | 10 liters per hour (STP). | 6.4 gms. | 11.4 | 40 | 11.9 | do | 50 | 765 | 5.5 | 10 | 14 |
| VII (786-53) | 44.7 | 38.4 | $Al_2(SO_4)_3$ solution (20 gms. $Al_2(SO_4)_3$ .18$H_2O$/ 100 mls. solution). | 8 mls. per minute. | 272 mls. | 11.6 | 10 | 12.1 | do | 50 | 462 | 4.4 | 56 | 80 |
| VIII (786-43) | 44.7 | 38.4 | $NH_4$ acetate (26.5 gms./100 mls. solution). | 4 mls. per minute. | 100 mls. | 11.3 | 13 | 11.85 | do | 50 | 810 | 5.5 | 13 | 19 |
| IX (786-45) | 44.7 | 38.4 | $H_2SO_4$ solution No. 1 of Ex. I. | 8 mls. per minute. | 200 mls. | 11.25 | 20 | 11.9 | do | 50 | 675 | 5.4 | 14 | 21 | mantle, thermometer, stirrer and water-cooled condenser. To the reaction flask is added 1 liter of water and stirring and heating are started. 322 grams of the final alumina hydrate made by the procedure of Example I, 13.6 grams of cobalt carbonate, and 22.5 grams of molybdenum trioxide (A.R. grade) are added and the temperature of the resulting slurry is brought to 160° F. Heating and stirring of the slurry are continued for 6 hours at 160° F. The mother liquor is filtered from the solid phase and the filter cake is oven dried at 230° F. The oven dried filter cake is mixed with Sterotex die lubricant, tableted to ⅛″ x ⅛″ size and calcined for 6 hours in air at 900° F. in an electric muffle furnace which is brought to calcination temperature in 3 hours. The resulting catalyst shows good aging stability in desulfurization petroleum hydrocarbons. Desulfurization conditions are 760° F., 450 p.s.i.g., 7.8 WHSV and 700 standard cubic feet of hydrogen-rich recycle gas per barrel of feed with hydrogen sulfide being removed from the recycle gases. The feed stock is a fluid catalytic light cycle oil of 23.8 API gravity having a boiling range of about 416 to 611° F. and containing about 2.0 weight percent of sulfur.

EXAMPLE XI

A platinum-alumina reforming catalyst is prepared from my hydrate composition by placing 2 liters of a slurry of alumina hydrate made by the procedure of Example II (containing 123 g. $Al_2O_3$/liter) in a 3-gallon stoneware jar and stirring vigorously for 30 minutes to effect thorough dispersion. With continued stirring, a platnium solution consisting of 34.3 ml. of $H_2PtCl_6$ solution (0.043 gm. Pt/ml.)+170 ml. of deionized water is added over a 5-minute period. After 10 minutes' additional stirring, hydrogen sulfide solution (343 ml. of deionized water saturated with $H_2S$ at 78° F.) is added slowly. The slurry is stirred an additional 30 minutes prior to drying. The resulting slurry is very thin and light brown in color. The slurry is poured into a Pyrex tray and placed in an Aminco forced air oven and drying is completed at 110° C. The dry catalyst is ground to pass 20 mesh, mixed with 2% Sterotex and formed as %32″ tablets. The Sterotex is burned out at 900° F. using 5 parts air plus 300 parts $N_2$ atmosphere; the $O_2$ content is then slowly increased, and finally the catalyst is calcined 6 hours at 900° F. in straight air. This catalyst shows good activity in reforming a straight run petroleum naphtha to high octane gasoline. The test conditions are 500 p.s.i.g., 4.4 WHSV, 925° F. and $5H_2$/naphtha molar ratio. The naphtha feed stock has a distillation range of about 245 to 400° F. and contains 56 percent paraffins, <1 percent olefins, 24 percent naphthenes and 19 percent aromatics.

I claim:

1. In a method for preparing an alumina hydrate composition consisting essentially of about 10 to 90 weight percent of aluminum trihydrate and a member selected from the group consisting of amorphous hydrous alumina, alumina monohydrate and their mixture, the steps comprising mixing an aqueous solution of sodium aluminate with a water-soluble compound which is acid-acting towards the sodium aluminate, while maintaining the pH of the mixture at least about 10.5 for at least about 5 minutes and no longer than a time sufficient to precipitate about 10 to 90 percent of alumina trihydrate based upon the final hydrate composition and forming an aqueous slurry of the alumina trihydrate precipitate, and mixing the slurry with a water-soluble compound which is acid-acting towards the sodium aluminate to lower the pH of the mixture to less than about 10 to precipitate a member selected from the group consisting of alumina monohydrate, amorphous hydrous alumina and their mixture to obtain an alumina hydrate composition essentially of a member selected from the group consisting of amorphous hydrous alumina, alumina monohydrate and their mixture and about 10 to 90 weight percent of aluminum trihydrate.

2. In a method for preparing an alumina hydrate composition consisting essentially of about 10 to 90 weight percent of aluminum trihydrate and a member selected from the group consisting of amorphous hydrous alumina, alumina monohydrate and their mixture, the steps comprising mixing an aqueous solution of sodium aluminate with a water-soluble compound which is acid-acting towards the sodium aluminate, while maintaining the pH of the mixture at least about 10.5 for at least about 5 minutes and no longer than a time sufficient to precipitate about 10 to 90 percent of alumina trihydrate based upon the final hydrate composition and forming an aqueous slurry of the alumina trihydrate precipitate, and mixing the slurry with a water-soluble compound which is acid-acting towards the sodium aluminate to lower the pH of the mixture to not greater than about 7 to precipitate a member selected from the group consisting of alumina monohydrate, amorphous hydrous alumina and their mixture to obtain an alumina hydrate composition consisting essentially of a member selected from the group consisting of amorphous hydrous alumina, alumina monohydrate and their mixture and about 10 to 90 weight percent of aluminum trihydrate.

3. The method of claim 2 in which the precipitated alumina trihydrate is about 10 to 50 percent based upon the final hydrate composition.

4. The method of claim 2 in which the precipitated alumina trihydrate is about 65 to 90 percent based upon the final hydrate composition.

5. The method of claim 2 in which the acid-acting compounds are selected from the group consisting of mineral acids and acidic aluminum salts.

6. In a method for preparing an alumina hydrate composition consisting essentially of about 10 to 90 weight percent of aluminum trihydrate and a member selected from the group consisting of amorphous hydrous alumina, alumina monohydrate and their mixture, the steps comprising mixing an aqueous solution of sodium aluminate with a water-soluble compound which is acid-acting towards the sodium aluminate, to obtain a mixture having a pH of about 11 to 11.5 for at least 5 minutes and no longer than a time sufficient to precipitate about 10 to 90 percent of alumina trihydrate based upon the final hydrate composition and forming an aqueous slurry of the alumina trihydrate precipitate while the pH rises to at least about 11.6, and mixing the slurry with a water-soluble compound which is acid-acting towards the sodium aluminate to lower the pH of the mixture to not greater than about 7 to precipitate a member selected from the group consisting of alumina monohydrate, amorphous hydrous alumina and their mixtures to obtain an alumina hydrate composition consisting essentially of a member selected from the group consisting of amorphous hydrous alumina, alumina monohydrate and their mixture and about 10 to 90 weight percent of aluminum trihydrate.

7. The method of claim 6 in which the acid-acting compounds are selected from the group consisting of mineral acids and acidic aluminum salts.

8. The method of claim 6 in which the precipitated alumina trihydrate is about 10 to 50 percent based upon the final hydrate composition.

9. The method of claim 6 in which the precipitated alumina trihydrate is about 65 to 90 percent based upon the final hydrate composition.

References Cited in the file of this patent

UNITED STATES PATENTS

| | | |
|---|---|---|
| 2,247,624 | Wall | July 1, 1941 |
| 2,406,420 | Weiser | Aug. 27, 1946 |
| 2,487,076 | Sharp et al. | Nov. 8, 1949 |
| 2,657,115 | Ashley | Oct. 27, 1953 |